United States Patent [19]

Kalvoda

[11] Patent Number: 4,834,559
[45] Date of Patent: May 30, 1989

[54] MULTIPLE-FACE RADIAL PLAIN BEARING

[75] Inventor: Franz X. Kalvoda, Frankenthal, Fed. Rep. of Germany

[73] Assignee: Klein, Schanzlin & Becker Aktiengesellschaft, Frankenthal, Fed. Rep. of Germany

[21] Appl. No.: 640,380

[22] Filed: Aug. 13, 1984

[30] Foreign Application Priority Data

Sep. 8, 1983 [DE] Fed. Rep. of Germany ....... 3332357

[51] Int. Cl.$^4$ ............................................. F16C 32/06
[52] U.S. Cl. ................................................... 384/118
[58] Field of Search ................. 384/99, 100, 107, 111, 384/114, 118, 286, 397, 398, 399

[56] References Cited

U.S. PATENT DOCUMENTS

| 3,101,980 | 8/1963 | Love | 384/114 |
| 3,722,965 | 3/1973 | Gemein et al. | 384/114 |
| 4,302,060 | 11/1981 | Nicholas et al. | 384/111 |

FOREIGN PATENT DOCUMENTS 903054 2/1954 Fed. Rep. of Germany .
1575476 1/1970 Fed. Rep. of Germany .
2628918 1/1978 Fed. Rep. of Germany ...... 384/118

Primary Examiner—David Werner
Attorney, Agent, or Firm—Peter K. Kontler

[57] ABSTRACT

The bearing shell of a multiple-face hydrodynamic radial plain bearing has an internal surface which is composed of several identical arcuate sections whose radii of curvature slightly exceed the radius of curvature of the rotary component within the shell. The central portion of each section is nearer to the external surface of the rotary component than the other portions, and each such central portion has a hydrostatic pressure chamber receiving the liquid which is conveyed by a fluid flow machine wherein the bearing shell is used or a different liquid, such as a lubricant. The axial length of each chamber is between 40 and 80 percent of the length of the bearing shell, and the width of each chamber is between 20 and 80 percent of the length of the respective section, as considered in the circumferential direction of the shell. The provision of pressure chambers contributes to the ability of the bearing shell to prevent vibration of and/or to otherwise stabilize the rotary component as well as to take up pronounced bearing forces.

13 Claims, 1 Drawing Sheet

MULTIPLE-FACE RADIAL PLAIN BEARING

BACKGROUND OF THE INVENTION

The present invention relates to radial bearings in general, and more particularly to improvements in radial plain bearings. Still more particularly, the invention relates to improvements in so-called multiple-face radial plain bearings wherein the internal surface of the bearing shell that surrounds a rotating component includes several sections or faces having radii of curvature greater than the radius of the rotary component within the shell.

Multiple-face radial plain bearings of the above outlined type are disclosed, for example, in German Pat. No. 903,054 and in German Offenlegungsschrift No. 15 75 472. An advantage of such bearings is that they furnish a highly satisfactory hydrodynamic supporting action for the component which is surrounded by the internal surface of the bearing shell. A drawback of presently known multiple-face radial plain bearings is that they are prone to jamming as a result of thermally induced expansion, especially if the bearing clearance between the external surface of the rotating component and the internal surface of the bearing shell is very small. In order to reduce the likelihood of jamming, the aforementioned German Offenlegungsschrift No. 15 75 472 proposes to make that part of the shell which is immediately adjacent to its internal surface from a yieldable material. This is also intended to furnish a desirable vibration-damping action.

OBJECTS AND SUMMARY OF THE INVENTION

An object of the invention is to provide a novel and improved multiple-face radial plain bearing which is not likely to jam in response to thermally induced expansion or contraction even if the material of its shell is not elastic in the region of the internal surface.

Another object of the invention is to provide a multiple-face radial plain bearing which can stand pronounced stresses and which can exert a desirable stabilizing influence upon the rotary component which is confined in its interior.

A further object of the invention is to provide a multiple-face radial plain bearing which can be used with particular advantage in fluid flow machines, such as centrifugal pumps, and which exhibits the advantages of presently known hydrodynamic and hydrostatic plain bearings but not the drawbacks of such conventional bearings.

An additional object of the invention is to provide a novel and improved shell which constitutes or forms part of the above outlined plain bearing.

Still another object of the invention is to provide the bearing shell with a novel and improved internal surface.

An additional object of the invention is to provide a novel and improved method of improving the characteristics of heretofore known multiple-face hydrodynamic radial plain bearings.

The invention is embodied in a multiple-face hydrodynamic radial plain bearing for a rotary cylindrical component having a predetermined radius, particularly for a component (such as a driven shaft) of a centrifugal pump. The improved bearing comprises a circumferentially complete annular bearing shell whose axis coincides with or is adjacent and parallel to the axis of the component which is surrounded by the shell. The internal surface of the shell includes several arcuate sections or faces extending in the circumferential direction of the shell and having radii of curvature greater than the predetermined radius. Consequently, each section or face of the internal surface of the shell has a first or central portion which is nearer to the axis of the shell than the remaining or second portions of the respective section. The shell has a hydrostatic pressure chamber in the first portion of at least one of the sections, preferably in the first portion of each section. The width of each chamber is preferably between 20 and 60 percent of the length of the respective section, as measured in the circumferential direction of the shell, and the length of each chamber is preferably between 40 and 80 percent of the length of the shell, as measured in the direction of the axis of the shell.

The bearing preferably further comprises means for admitting a liquid medium into each pressure chamber whence the admitted medium flows into and spreads in the bearing clearance existing between the internal surface of the shell and the external surface of the component which is journalled in the shell. The liquid can constitute a lubricant, i.e., a medium which is admitted into the pressure chamber or chambers for the express purpose of enhancing the quality of the bearing. Alternatively, and if the improved bearing is used in a liquid conveying machine, the means for admitting a liquid medium into the pressure chamber or chambers may constitute a means which admits the conveyed liquid.

The number of sections can greatly exceed two, and the internal surface of the bearing shell can consist of identical sections.

That portion of each pressure chamber which is located at a maximum distance from the axis of the shell is preferably more distant from the axis than any part of the remaining portions of the aforementioned sections. The shell can have concave surfaces bounding the pressure chambers therein. The difference between the radius of curvature of any section and the predetermined radius can be a small or minute fraction of the predetermined radius.

The novel features which are considered as characteristic of the invention are set forth in particular in the appended claims. The improved bearing itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
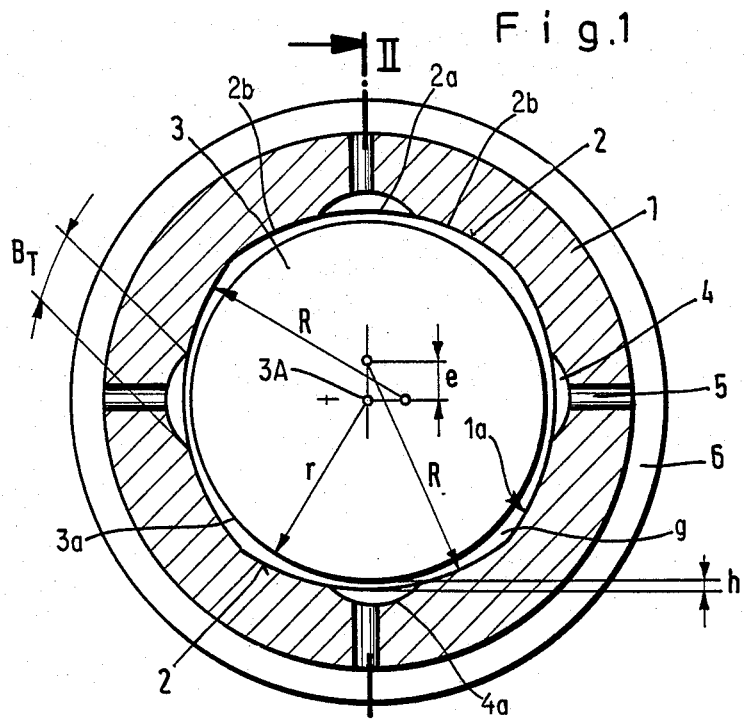
FIG. 1 is a transverse sectional view of a multiple-face radial plain bearing which embodies one form of the present invention.

The hydrodynamic multiple-face radial plain bearing which is shown in the drawing comprises a circumferentially complete bearing shell 1 having a composite internal surface 1a composed of four identical arcuate sections or faces 2. The radius of the rotary component 3 (e.g., the shaft of a centrifugal pump or another fluid flow machine) is shown at r; this shaft is not hatched in FIG. 1 for the sake of clarity, namely, to clearly show the axis 3A of the component 3 (such axis coincides with or is closely adjacent and parallel to the axis of the bearing shell 1) and the centers of curvature of the arcuate sections or faces 2 of the internal surface 1a. As can be seen in FIG. 1, the radius R of curvature of each section 2 exceeds the radius r; the difference (which is shown at e) is exaggerated in the drawing for the sake of clarity. Each of the sections 2 has a centrally located first portion 2a which is nearest to the external surface 3a of the rotary component 2 and remaining or second portions 2b which flank the respective first portion 2a and are located at a greater distance from the axis 3A. Thus, the bearing clearance 9 which is defined by the external surface 3a of the component 3 and the internal surface 1a of the shell 1 includes alternating narrower portions and wider portions which are respectively disposed in the regions of the first portions 2a and second or remaining portions 2b of the sections 2. FIG. 1 illustrates the ideal situation when the axis of the shell 1 coincides with the axis 3A of the rotary component 3 so that the width h of each narrower portion of the bearing clearance 9 is the same.

In accordance with a feature of the invention, the bearing shell 1 has a hydrostatic pressure chamber 4 machined into or otherwise formed in the first portion 2a of at least one of the four sections 2, preferably in the first portion 2a of each and every section 2. Each of the chambers 4 is bounded by a concave surface 4a of the bearing shell 1, and the length $L_T$ of each chamber 4, as considered in the axial direction of the shell 1, is preferably between 40 and 80 percent of the length L of the shell 1, for example, approximately 0.6 L. The width $B_T$ of each chamber 4 is preferably between 20 and 80 percent of the length of the respective section 2, as considered in the circumferential direction of the shell 1. In the illustrated embodiment, the width $B_T$ is approximately 30 percent of the length of the respective section 2.

Figure 2:
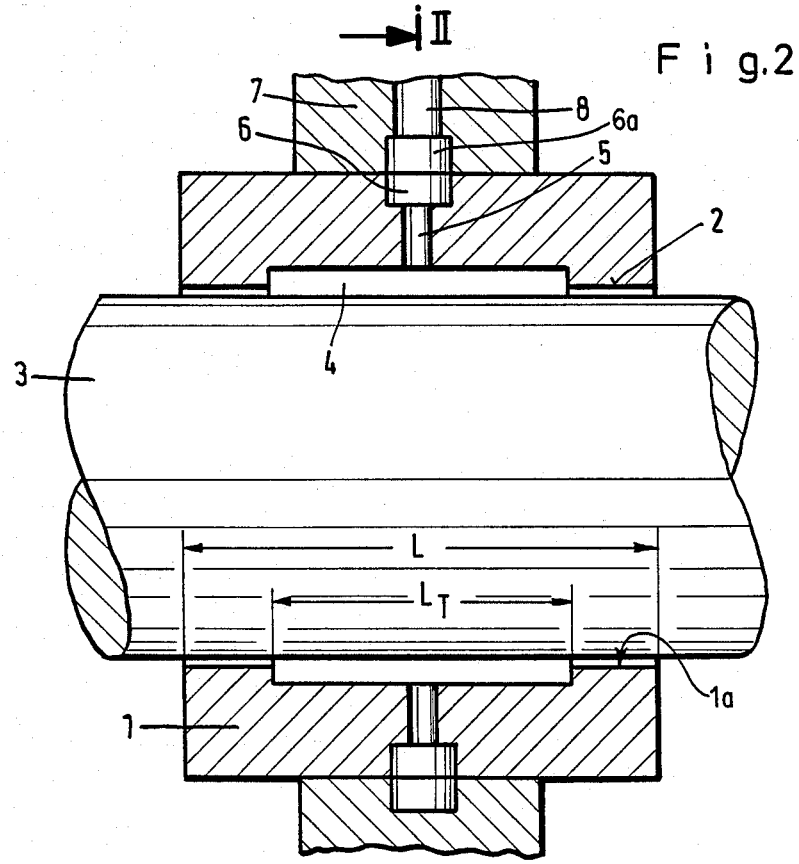
FIG. 2 is an axial sectional view as seen in the direction of arrows from the line II—II of FIG. 1.

The means for admitting a liquid medium into the pressure chambers 4 includes throttling channels or passages 5 which are machined into the shell 1 and extend substantially radially outwardly of the respective chambers and communicate with a circumferentially extending groove 6 machined into or otherwise formed in the external surface of the shell 1. FIG. 2 further shows a wall 7 which can form part of the pump housing and surrounds the external surface of the bearing shell 1. The cylindrical internal surface of the wall 7 has a circumferentially extending groove 6a which is in register with the groove 6 and receives liquid medium from one or more radially extending channels 8. Such channels can admit a lubricant in the form of a readily flowable or in the form of a highly viscous substance. Alternatively, and especially if the bearing of the present invention is used in a fluid flow machine, the channel or channels 8 can admit the medium which is being conveyed by such machine.

In the illustrated embodiment, the four pressure chambers 4 are machined centrally into the median portions (first portions 2a) of the respective sections or faces 2, i.e., exactly midway between the regions where the second portions 2b of such sections merge into each other. In other words, the angular distance between the centers of each pair of neighboring pressure chambers 4, as considered in the circumferential direction of the rotary component 1, is exactly 90 degrees.

The number of sections 2 can be increased well beyond four, for example, to between nine and twelve. This depends on a number of parameters, such as the radius r of the component 3. For example, the number of sections 2 will or can be increased to between nine and twelve if the diameter of the component 3 is in the range of 800 mm. The number of pressure chambers 4 may but need not match the number of sections 2. For example, pressure chambers can be provided in alternate sections of the internal surface of the bearing shell.

The number of sections 2 and/or pressure chambers 4 further depends upon the nature of the machine in which the bearing is put to use, on the exact location of the bearing shell in the machine (e.g., in a centrifugal pump the shell can surround the pump shaft) and on the desired centering action of the liquid medium in the bearing clearance 9. The improved bearing can be used in lieu of conventional shaft bearings in centrifugal pumps or as a substitute for conventional split rings. In a centrifugal pump, the number of sections 2 and/or pressure chambers 4 will further depend on the ratio of the numbers of vanes on the impeller and diffuser as well as on the extent to which the improved bearing is to oppose or reduce vibration and/or other stray movements. Still further, the number of sections 2 and/or pressure chambers 4 in a bearing shell which is put to use in a centrifugal pump will depend on the diameter of the impeller and/or diffuser.

The improved bearing is actually a hybrid which embodies the features of hydrodynamic and hydrostatic bearings. It has been found that such a hybrid structure greatly enhances the supporting and centering ability of the bearing shell and the dynamic characteristics of the bearing shell greatly enhance its ability to reduce or eliminate vibratory and other stray movements of the rotary component as well as to further stabilize the rotary component.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A multiple-face hybrid hydrostatic-hydrodynamic radial plain bearing for a rotary cylindrical component having a predetermined radius, particularly a component of a centrifugal pump, comprising a bearing shell having an axis, and an internal surface including a plurality of arcuate sections extending in the circumferential direction of the shell and having radii of curvature greater than said predetermined radius, each of said sections having a different center, and each of said section including a first portion which is nearer to said axis than all remaining portions of the respective section, said shell further having a hydrostatic pressure chamber in the first portion of at least one of said sections.

2. The plain bearing of claim 1, wherein the width of said chamber is between 20 and 60 percent of the length of the respective section, as considered in the circumferential direction of the shell.

3. The plain bearing of claim 1, wherein the length of said chamber is between 40 and 80 percent of the length of said shell, as considered in the direction of said axis.

4. The plain bearing of claim 1, wherein said shell has a pressure chamber in the first portion of each of said sections.

5. The plain bearing of claim 1, further comprising means for admitting a liquid medium into said chamber whence the admitted liquid spreads into the bearing clearance between said internal surface and the external surface of the component which is journalled in said shell.

6. The plain bearing of claim 5, wherein the liquid is a lubricant.

7. The plain bearing of claim 1 for use in a liquid conveying machine, further comprising means for admitting into said chamber liquid which is conveyed by the machine.

8. The plain bearing of claim 1, wherein the number of said sections exceeds two.

9. The plain bearing of claim 1, wherein said internal surface consists of more than two identical sections.

10. The plain bearing of claim 1, wherein said chamber has a portion located at a maximum distance from said axis and said distance exceeds the maximum distance between said axis and the remaining portions of said sections.

11. The plain bearing of claim 1, wherein said shell has a concave surface bounding said chamber.

12. The plain bearing of claim 1, wherein the difference between each of said radii of curvature and said predetermined radius is a minute fraction of the predetermined radius.

13. The plain bearing of claim 1, wherein said sections are substantially symmetrically arranged circumferentially of said internal surface.

* * * * *